May 28, 1946.  E. WILCOX  2,400,899
POWER PLANT
Filed Sept. 26, 1941  6 Sheets-Sheet 1

INVENTOR
EVERETT WILCOX
BY
ATTORNEYS

INVENTOR
EVERETT WILCOX
ATTORNEYS

INVENTOR
EVERETT WILCOX
BY
ATTORNEYS

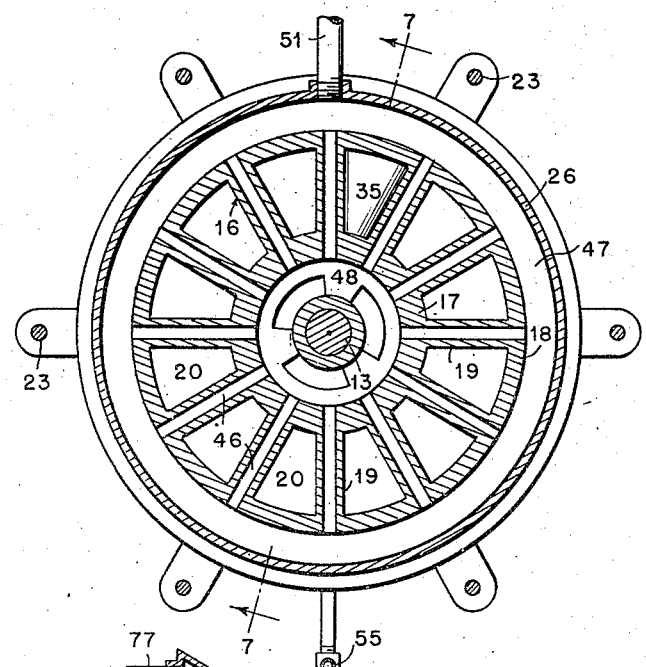
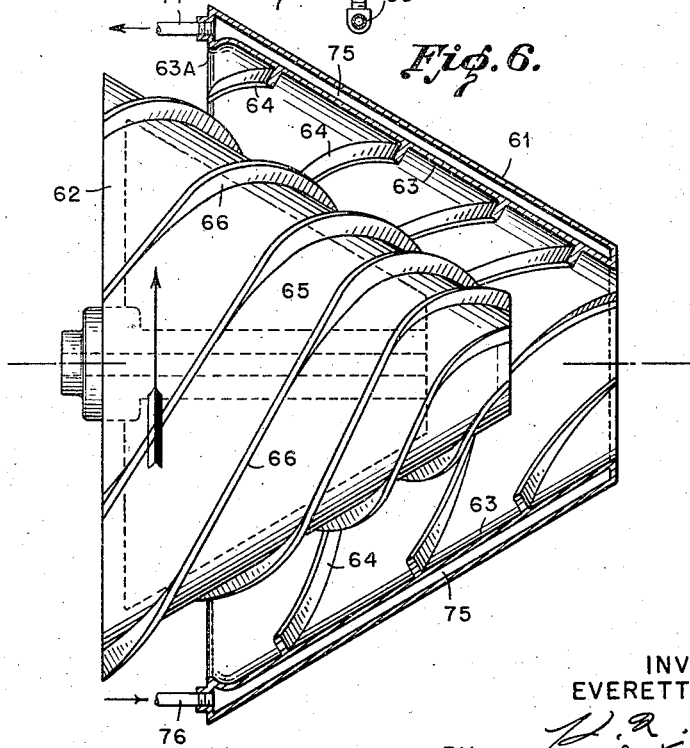

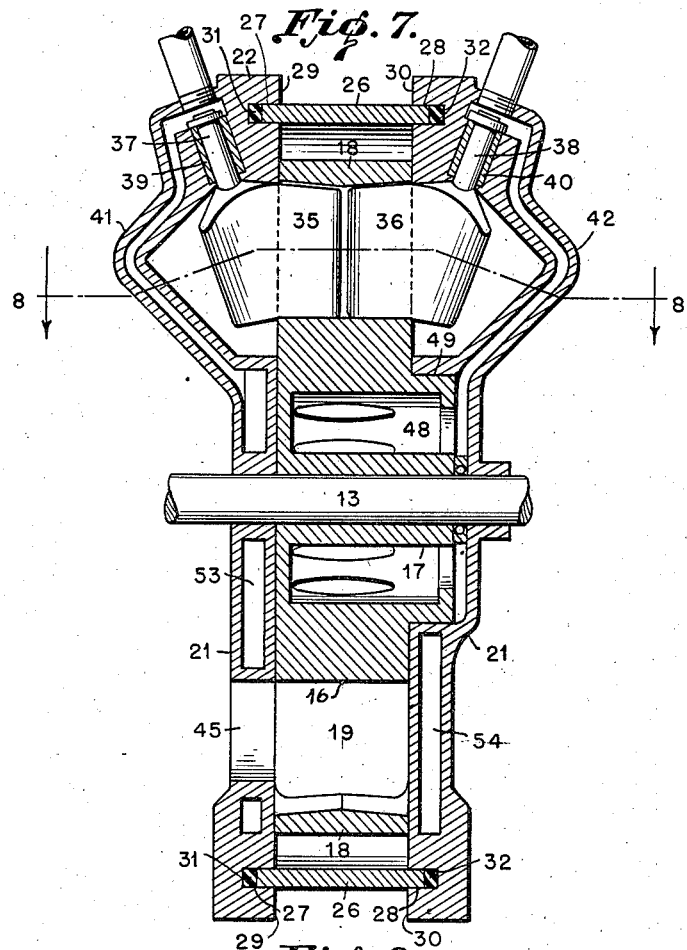
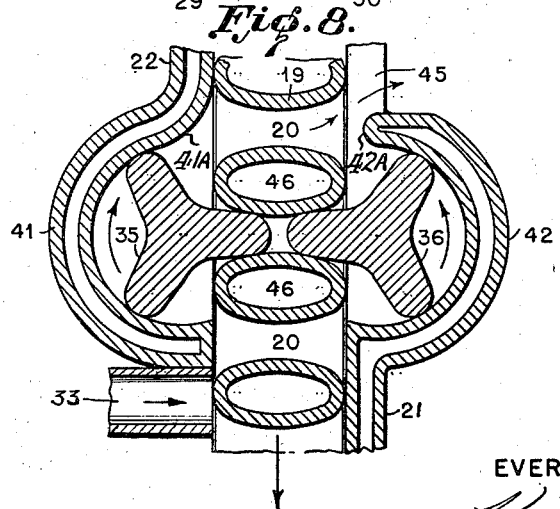

Patented May 28, 1946

2,400,899

UNITED STATES PATENT OFFICE 2,400,899

POWER PLANT

Everett Wilcox, Hyattsville, Md.

Application September 26, 1941, Serial No. 412,478

6 Claims. (Cl. 60—44)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to power plants and it is more particularly concerned with a device which generates gases under pressure and delivers them to a means for converting the potential energy of the gas into useful work.

One of the objects of this invention is the provision of such a device which will generate gases from hydrocarbon oils such as gasolene, crude oil, kerosene, and others, and which will burn the fuel completely before it is exhausted from the power converting means.

Another object of this invention is the provision of such a device in which the gases are generated continuously, substantially without any intermittent action.

A further object of this invention is the provision of such a device which will furnish a continuous flow of power without reciprocating motion or reversal in direction of any part.

Other objects and advantages of this invention will be apparent from the following description considered together with the accompanying drawings, illustrating an embodiment of this invention, in which drawings:

Figure 5 is a section along the line 5—5 of Figure 1.

Figure 6 is a vertical section of the stationary cone of the turbine unit with the rotatable cone partially removed in elevation.

Figure 7 is a longitudinal section through the generator indicated along the line 7—7 of Figure 5.

Figure 3:
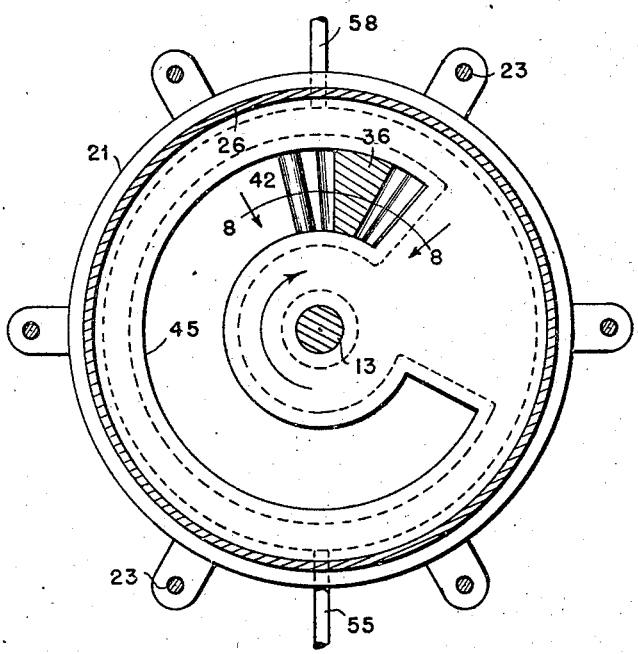
Figure 3 is a section along the line 3—3 of Figure 1.
Figure 4:
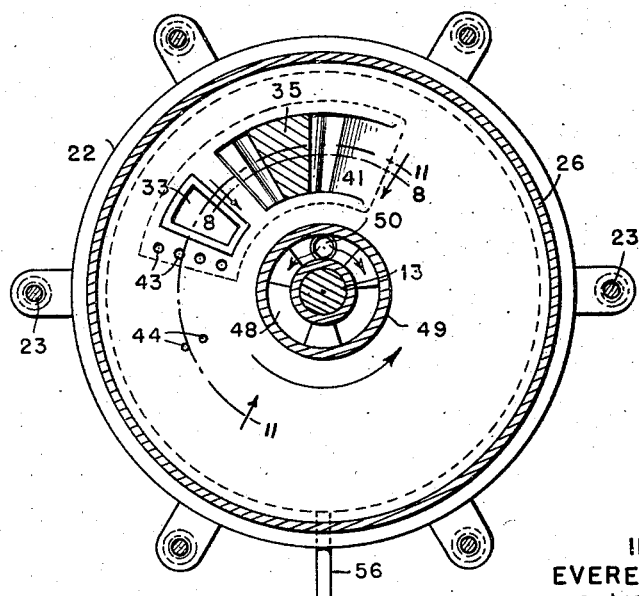
Figure 4 is a section along the line 4—4 of Figure 1.

Figure 8 is a partial section along the line 8—8 of Figure 7, the section being curved parallel to the periphery of the wheel 16 as indicated in Figures 3 and 4.

Figure 2:
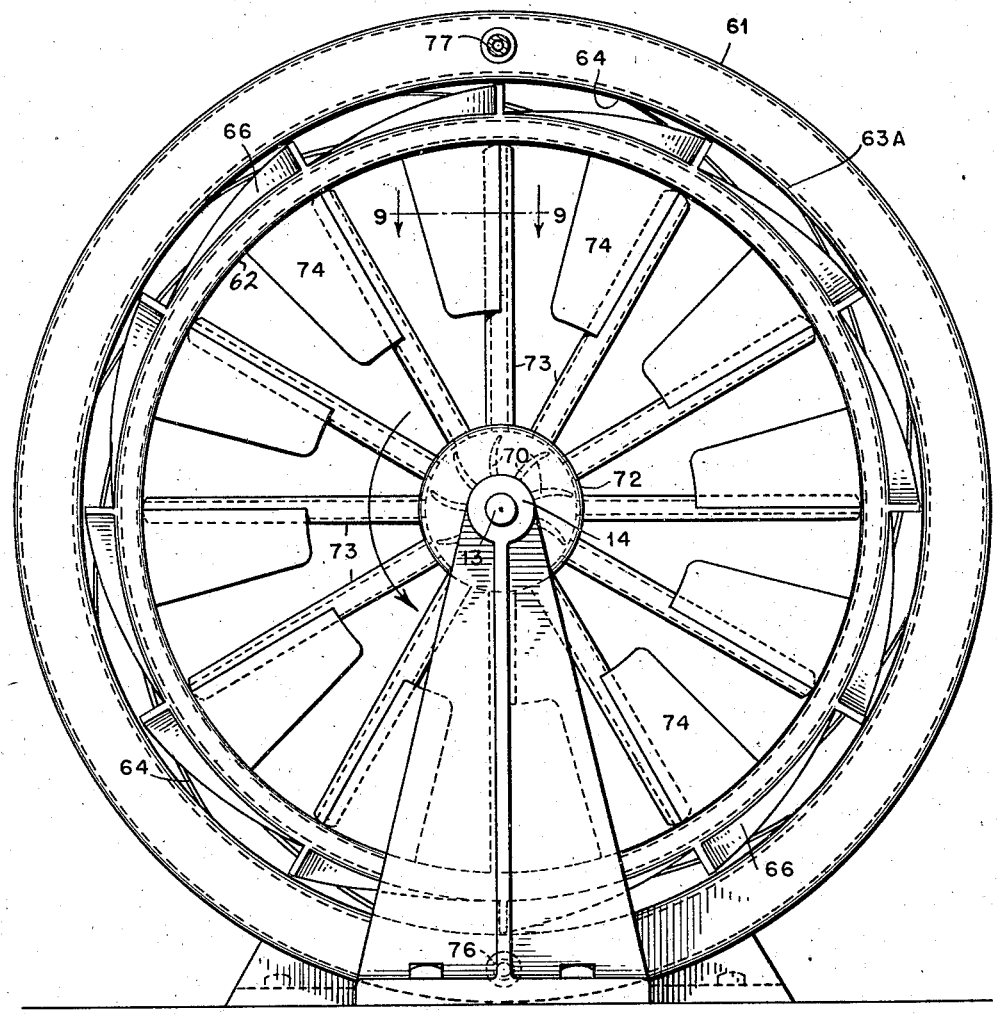
Figure 2 is an end view of the turbine side.
Figure 9:
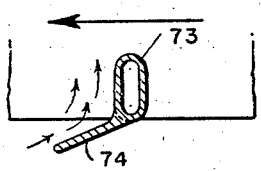

Figure 9 is a partial section along the line 9—9 of Figure 2.

Figure 1:
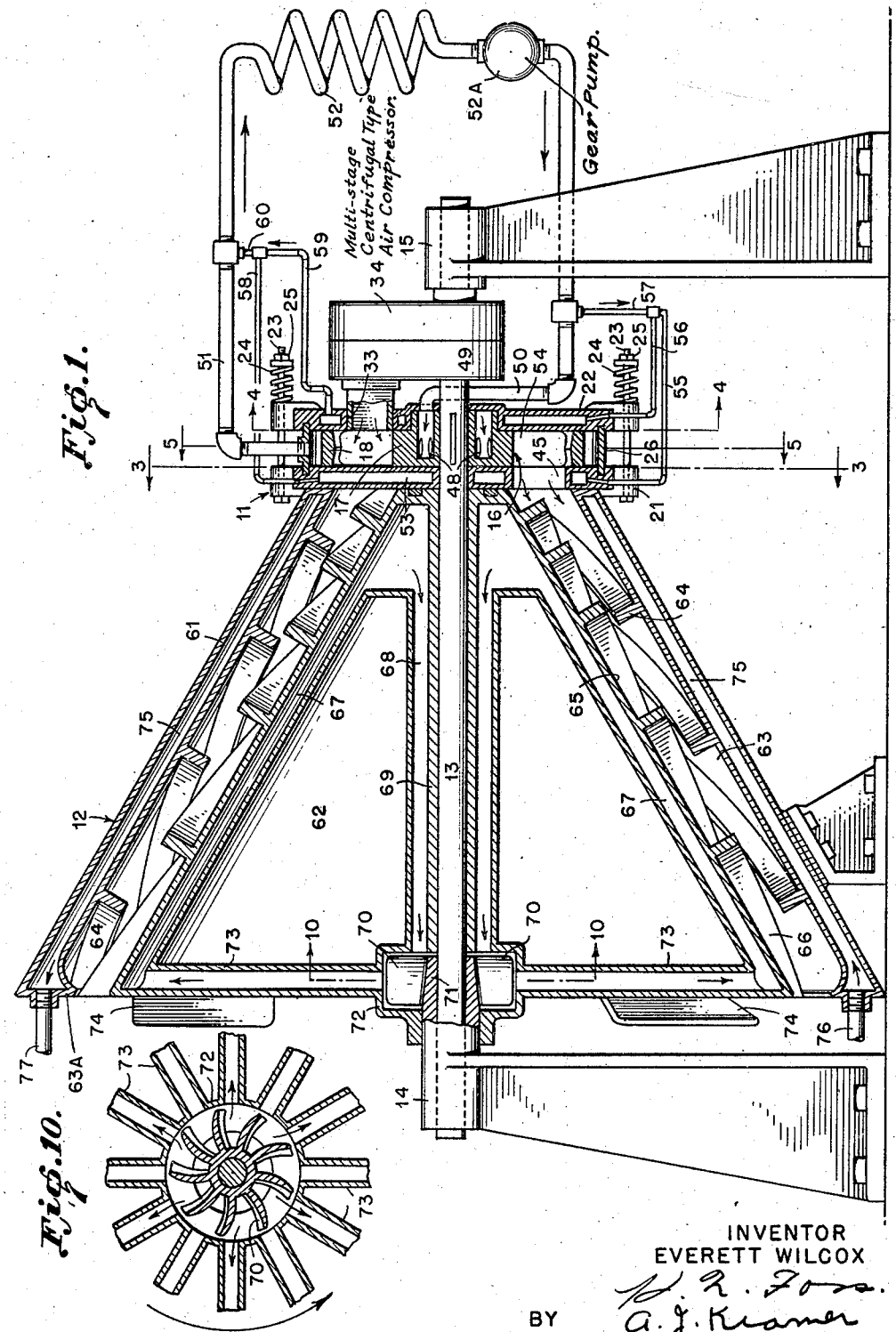
Figure 1 is a longitudinal section.

Figure 10 is a section along the line 10—10 of Figure 1.

Figure 11:
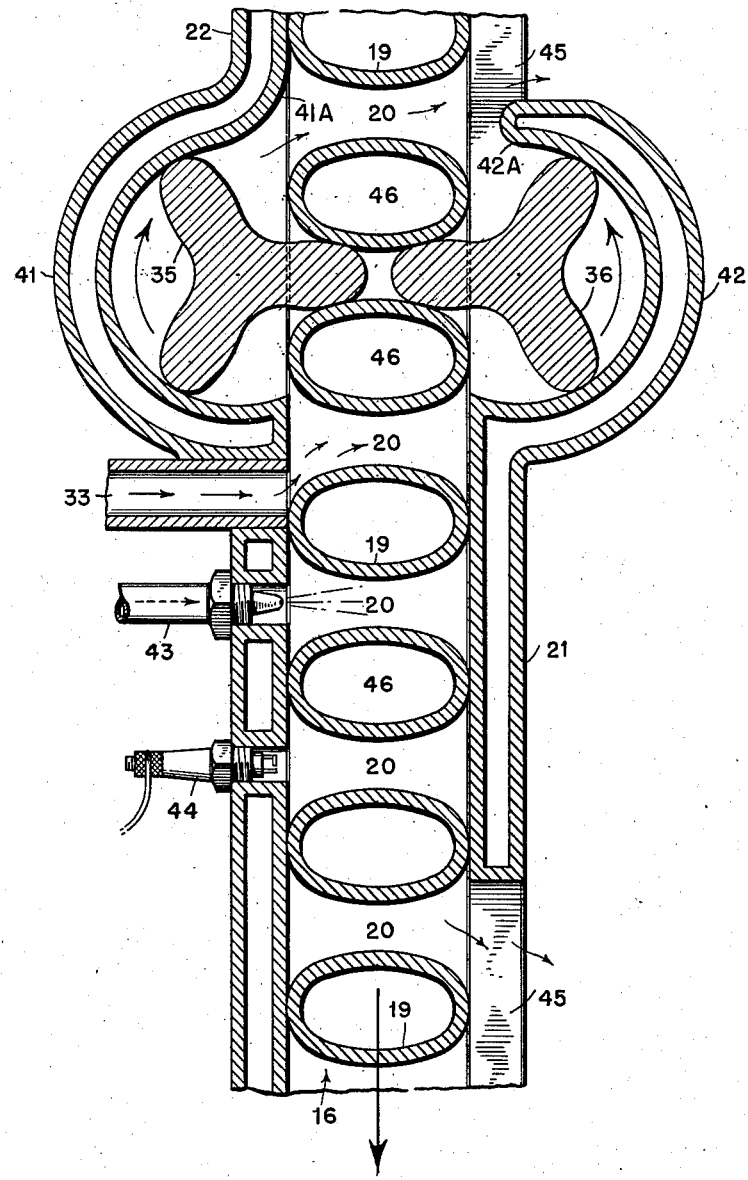

Figure 11 is a developed section along the line 11—11 of Figure 4.

Referring with more particularity to the drawings, in which like numerals designate like parts, the embodiment illustrated comprises two general units, namely, the generator 11 and the turbine 12, both of which are mounted on a common shaft 13, suitably supported for rotation in stationary bearings 14 and 15.

The generator comprises a rotor or wheel 16 fixed to the shaft 13 for rotation therewith. Said wheel includes a hub 17, an outer rim 18 and a plurality of equally spaced spokes 19, the spaces 20 therebetween, from one side of the wheel to the other, being where combustion charges are introduced. The wheel 16 is held between two stationary plates 21 and 22. These plates extend outward radially beyond the rim 18 of the wheel where they are held against the opposite faces of the wheel by means of bolts 23 under tension of springs 24. Tension in the springs 24 is adjustable by means of nuts 25.

A sealing band 26, wider and somewhat larger in diameter than the periphery of the wheel 16, is concentrically disposed between the plates 21 and 22 and is held in annular grooves 27 and 28 on the inner faces 29 and 30 of the plates 21 and 22, respectively. Gaskets 31 and 32 are provided between the band 26 and the grooves 27 and 28 to effect an air-tight closure.

Through the plate 22 an air intake port 33 is provided having an area sufficient to cover one or more of the spaces 20 and it is connected to the delivery side of an air compressor 34, of the multistage centrifugal type powered from the shaft 13.

The spokes 19 mesh with a pair of cooperating pinions 35 and 36 disposed on opposite sides of the wheel 16 through the plates 21 and 22 there being preferably three vanes to each pinion. These pinions have axial shafts 37 and 38 extending therefrom which are rotatably carried in bearings 39 and 40 in the plates 21 and 22, respectively, at one end of the air intake port 33. The pinions 35 and 36 are enclosed by housings 41 and 42 integral with the plates 21 and 22. The housings 41 and 42 are rounded on the exhaust sides at 41A and 42A, as shown in Figures 8 and 11, so that the gas in the spaces 20 will not be trapped as the spokes 19 pass into the housing cavity, and the gas being expelled by the pinions 35 and 36 begins escaping behind spokes 19 before these pinions close the spaces 20.

The vanes of the pinions 35 and 36 as they mesh with the spokes 19 fill the spaces 20 and thus scavenge them just before they are opened to the air intake port 33. Consequently, the curvature of the vanes of the pinions and that of the spokes 19 must be such as to permit this function, such as cycloidal.

Beyond the other end of the port 33 fuel injectors 43 and ignition plugs 44 are disposed through the plate 22. The plate 21 is provided with an exhaust port 45 which extends from the housing 42 around to a point opposite the ignition plugs 44. The exhaust port 45 opens into the intake of the turbine 12, which will be hereinafter more fully described.

The solid parts of the plates 21 and 22 including the housings 41 and 42, the hub 17 and spokes 19 are provided with passages through which a cooling fluid is circulated. The passages 46 through the spokes open into the space 47 between the sealing band 23 and the rim 18 at one end and into an annular passage 48 in the hub 17. The hub 17 extends outwardly into the plate 22 which is provided with a bearing surface 49. The cooling fluid is introduced into the passage 48 from a pipe line 50 tapped in through the plate 22 and is withdrawn through a pipe line 51 tapped in through the sealing band 26 whence it is returned to the pipe 50 after passing through a suitable heat exchanger 52. Power to circulate the cooling fluid through this circuit is supplied by a gear pump 52A and by centrifugal force developed in the fluid in the passages of the spokes 19 as the wheel rotates. The passages 53 and 54 in the plates 21 and 22 are supplied with cooling fluid through inlet pipes 55 and 56 tapped into the pipe 50 by a connecting pipe 57. The outlet pipes for these passages are designated by the numerals 58 and 59, which pipes are tapped into the pipe 51 by means of a connecting pipe 60.

The turbine comprises two concentric truncated cones, the outer cone 61 being hollow and stationary, the smaller end of which is concentrically secured to the outer side of the plate 21 about the exhaust port 45. The second cone 62 is disposed within the cone 61 and is fixed to the shaft 13. The smaller end of the cone 62 abuts the center of the outer side of the plate 21. The cone 61 is provided on its inner surface with spiral grooves 63 expanding toward the larger end of the cone, at which end they are closed by an annular lip 63A of the cone 61. These grooves are formed by ribs of fins 64. The cone 62 is also provided with spiral grooves 65 expanding toward the larger end, but these grooves are carried on the outer surface and are formed by ribs or fins 66 in contact with the fins 64. The spiral grooves 65 are open at the outer end and are generated in the opposite direction from that of the grooves 63 so that the fins 64 and 66 cross each other at sharp angles. The pitch and length of the cones, the number of grooves and the angles between them may be varied to obtain different operating conditions.

On the inner surface of the inner cone, a cooling jacket 67 is provided which is integral with an annular passage 68 about the longitudinal hub 69 of the cone. On the outer end of the hub 69 stationary blades 70 are mounted about the shaft 13. The blades 70 are held stationary by virtue of the fact that their hub 71 is integral with or fixed to the bearing 14. The blades 70 are housed in a casing 72 integral with the outer wall of the passage 68 and extends about the bearing 14, with which said casing is rotatably engaged. The casing 72 is connected to the cooling jacket 67 by means of a plurality of hollow spokes 73 so as to provide continuous paths for circulating a cooling fluid through the jacket 67 and passage 68. On the outside of the spokes 73, deflectors or fins 74 are secured for the purpose of forcing air inwardly over the spokes 73 to cool liquid therein as it circulates. These fins 74 are disposed near the outer ends of the spokes 73 and terminate at suitable points between the ends of the spokes 73 to permit the air forced inward to escape around the hub.

The outer cone 61 is provided with a jacket 75 in which a cooling liquid is circulated. The cooling liquid is forced in through an inlet 76 at the bottom and withdrawn through an outlet 77 at the top.

As the wheel 16 rotates, the spaces 20 pass over the air intake port 33 and are charged with compressed air. Upon leaving the air intake port, fuel is injected into the compressed air charge by the fuel injectors 43. The mixture of fuel and compressed air is ignited as soon as it is opened to the exhaust port 45 to contact the hot gases of preceding combustions. In starting, however, it is necessary to use the ignition plugs 44 until the temperature of the combustion gases in the exhaust port is sufficient to ignite the mixture. The burning of the fuel takes place continuously as it passes into the exhaust port and into the grooves of the cones where combustion is completed. The combustion gases passing through the exhaust port enter the turbine and are expanded in the spiral grooves 63 and 65. Should any fuel mixture have insufficient time to completely burn before leaving the exhaust port it will continue to burn in the spiral grooves so that no power is lost due to incomplete combustion. As the gases change direction continuously through the grooves they act against the fins 66 of the inner cone, which action forces it to rotate. At the larger end of the turbine all of the gases are forced outward through the grooves of the inner cone due to the fact that the grooves of the stationary cone are closed at this end.

As the spaces 20 leave the exhaust port they are engaged by the vanes of the pinions 35 and 36 which push the gases out, thereby acting as mechanical scavengers, and prevent these gases from re-entering until the spaces pass through. At least one of the vanes of each pinion is always in contact with its respective housing, and at least one other of the vanes of each pinion is always in contact with at least one of the spokes 19 of the wheel 16. Consequently, an effective barrier is maintained to prevent gases escaping from the high pressure side of the wheel 16 to the low pressure side. This scavenging effect by the vanes of the pinions clears the spaces 20 for receiving a fresh charge of compressed air from the compressor 34.

Rotation of the inner cone 62 causes cooling liquid in the casing 72 to be forced outward radially by the stationary blades 70 and consequently the liquid is circulated through the spokes 73, jacket 67 and annular passage 68, back to the casing 72.

Having thus described my invention, I claim:

1. A power plant comprising a spoke wheel mounted on a shaft for rotation therewith, said wheel having a continuous rim, the spaces between the spokes and rim from one side of the wheel to the other forming fuel chambers, non-rotatably mounted plates covering the sides of said wheel, means for urging said plates against the sides of said wheel, the plate on one side having an opening therethrough for the induction of air under pressure to charge said spaces with compressed air as they pass said opening, means for injecting fuel into said spaces as they pass beyond said opening to form combustible charges therein, the plate on the other side having an opening therethrough for the exhaust of said combustible charges, a combustion chamber in receiving relation with the exhaust opening, the heat generated by the combustion in said combustion chamber of previously delivered charges serving to ignite fresh combustible charges of the fuel chambers as the charges are successively exposed to said exhaust opening, and mechanical scavengers between said openings for said chambers, said scavengers operating on the sides of said wheel, and being engaged and driven by the spokes of said wheel.

2. A power plant comprising a spoke wheel mounted on a shaft for rotation therewith, said wheel having a continuous rim, the spaces between the spokes and rim from one side of the wheel to the other forming fuel chambers, non-rotatably mounted plates covering the sides of said wheel, means for urging said plates against the sides of said wheel, the plate on one side having an opening therethrough for the induction of air under pressure to charge said spaces with compressed air as they pass said opening, means for injecting fuel into said spaces as they pass beyond said opening to form combustible charges therein, the plate on the other side having an opening therethrough for the exhaust of said combustible charges, means for optionally igniting combustible charges in said spaces beyond said fuel injecting means, a combustion chamber in receiving relation with the exhaust opening, the heat generated by the combustion in said combustion chamber of previously delivered charges being utilizable to ignite fresh combustible charges of the fuel chambers as the charges are successively exposed to said exhaust opening, and mechanical scavengers between said openings for said fuel chambers, said scavengers operating on the sides of said wheel and being engaged and driven by the spokes of said wheel.

3. A power plant comprising a spoke wheel mounted on a shaft for rotation therewith, said wheel having a continuous rim, the spaces between the spokes and rim from one side of the wheel to the other forming fuel chambers, non-rotatably mounted plates covering the sides of said wheel, means for urging said plates against the sides of said wheel, the plate on one side having an opening therethrough for the induction of air under pressure to charge said spaces with compressed air as they pass said opening, means for injecting fuel into said spaces as they pass beyond said opening to form combustible charges therein, the plate on the other side having an opening therethrough for the exhaust of said combustible charges, a combustion chamber in receiving relation with the exhaust opening, the heat generated by the combustion in said combustion chamber of previously delivered charges serving to ignite fresh combustible charges of the fuel chambers as the charges are successively exposed to said exhaust opening, mechanical means carried by said plates for scavenging the spaces in said wheel beyond said exhaust opening, said scavenging means operating on the sides of said wheel and being engaged and driven by the spokes of said wheel.

4. A power plant comprising a spoke wheel mounted on a shaft for rotation therewith, said wheel having a continuous rim, the spaces between the spokes and rim from one side of the wheel to the other forming fuel chambers, non-rotatably mounted plates covering the sides of said wheel, means for urging said plates against the sides of said wheel, the plate on one side having an opening therethrough for the induction of air under pressure to charge said spaces with compressed air as they pass said opening, means for injecting fuel into said spaces as they pass beyond said opening to form combustible charges therein, the plate on the other side having an opening therethrough for the exhaust of said combustible charges, a combustion chamber in receiving relation with the exhaust opening, the heat generated by the combustion in said combustion chamber of previously delivered charges serving to ignite fresh combustible charges of the fuel chambers as the charges are successively exposed to said exhaust opening, pinions carried by said plates between said openings for scavenging said fuel chambers, and passages for circulating a cooling fluid through said wheel and plates, the passages through said wheel including radial passages whereby when liquid is in said radial passages, the rotation of said wheel creates a centrifugal force which tends to move said liquid through said radial passages.

5. A power plant comprising a spoke wheel mounted on a shaft for rotation therewith, said wheel having a continuous rim, the spaces between the spokes and rim from one side of the wheel to the other forming fuel chambers, non-rotatably mounted plates covering the sides of said wheel, means for urging said plates against the sides of said wheel, the plate on one side having an opening therethrough for the induction of air under pressure to charge said spaces with compressed air as they pass said opening, means for injecting fuel into said spaces as they pass beyond said opening to form combustible charges therein, the plate on the other side having an opening therethrough for the exhaust of said combustible charges, a combustion chamber in receiving relation with the exhaust opening, the heat generated by the combustion in said combustion chamber of previously delivered charges serving to ignite fresh combustible charges of the fuel chambers as the charges are successively exposed to said exhaust opening, a pair of pinions rotatably carried opposite each other by said plates adjacent to the sides of the wheel, the vanes of said pinions being disposed to mesh with the spaces of said wheel as it rotates, said pinions being in housings integral with said plates and communicating with the space between said plates, there being a sufficient number of vanes on said pinions so that at least one of the vanes of each pinion is in contact with its respective housing and another in contact with the wheel.

6. A power plant comprising a spoke wheel mounted on a shaft for rotation therewith, said wheel having a continuous rim, the spaces between the spokes and rim from one side of the wheel to the other forming fuel chambers, non-rotatably mounted plates covering the sides of said wheel, means for urging said plates against the sides of said wheel, the plate on one side having an opening therethrough for the induction of air under pressure to charge said spaces with compressed air as they pass said opening, means for injecting fuel into said spaces as they pass beyond said opening to form combustible charges therein, the plate on the other side having an opening therethrough for the exhaust of said combustible charges, a combustion chamber in receiving relation with the exhaust opening, the heat generated by the combustion in said combustion chamber of previously delivered charges serving to ignite fresh combustible charges of the fuel chambers as the charges are successively exposed to said exhaust opening, scavenging means for said chambers, passages for circulating a cooling fluid through said wheel and plates, the passages through said wheel including radial passages whereby when liquid is in said radial passages the rotation of said wheel creates a centrifugal force which tends to move said liquid through said radial passages, and an annular band spaced around the rim of the wheel and sealed between said plates, the space between said band and said wheel being open to said radial passages, said annular band having an outlet therethrough for carrying off liquid under pressure in said last-mentioned space.

EVERETT WILCOX.